United States Patent Office

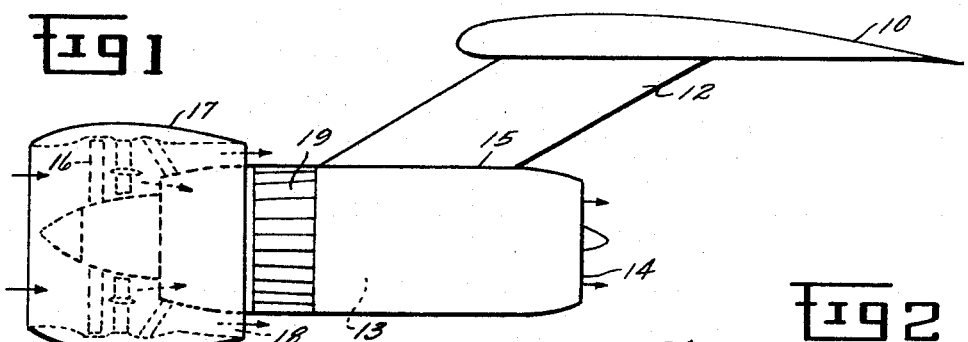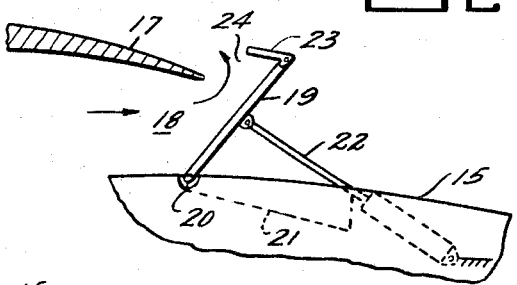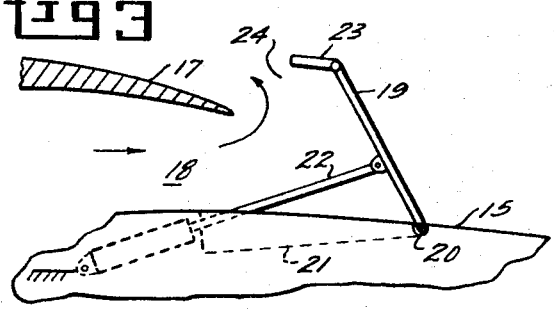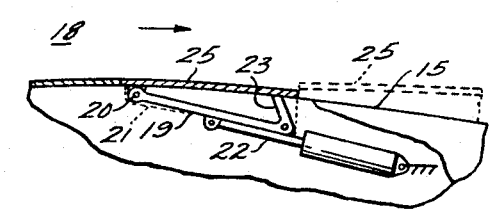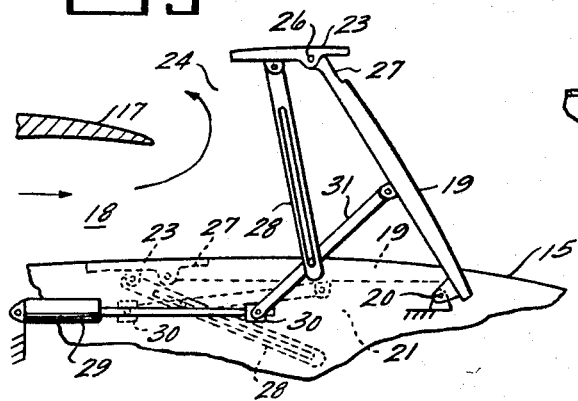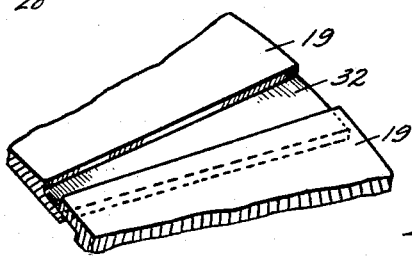
INVENTOR.
JOHN T. KUTNEY
ATTORNEY—

3,280,561
Patented Oct. 25, 1966

3,280,561
THRUST REVERSER MECHANISM
John T. Kutney, Cincinnati, Ohio, assignor to General Electric Company, a corporation of New York
Filed June 7, 1965, Ser. No. 462,789
9 Claims. (Cl. 60—226)

The present invention, a continuation-in-part of application Serial No. 393,620 filed September 1, 1964, now abandoned, relates to a thrust reverser mechanism and, more particularly, to a thrust reverser mechanism that is particularly applicable to by-pass type fan engines.

With the advent of the fan engine, whether forward or aft fan, it has become necessary to supply thrust reverser mechanism to reverse the fluid flow through the generally annular cross-section of the by-pass duct. Because the use of fans with conventional jet engines results in larger diameter engines or cruise fans, it is desired to provide reverser mechanism that does not add appreciably to an already large diameter when in the reversing position. Furthermore, because the engines become large and the reversing operation must be carried out on a relatively large periphery, it becomes important that the reversing structure be lightweight and straightforward and simple in operation. The high by-pass ratio turbofan of about 4 to 1 and above, is a fan engine in which a very large quantity of propulsive fluid is sent through the annular by-pass duct. In such engines, it may be possible to reverse only the by-pass flow since the flow through the jet engine, whether concentric or remote, is a proportion as small as 10%–15% of the total flow. Reversing efficiently only the by-pass flow in such high by-pass ratio engines is sufficient to obtain the reversing necessary to meet the specifications.

It is well understood that thrust reversers must perform two functions. They must stop the flow and they must turn the flow into the reverse position. It is desired to do this where there is as little disturbance or change as possible in the normal aerodynamic members that are required for other engine functions.

In most of the present type thrust reversers, the aircraft geometry has been compromised to reflect the physical mass of the reverser unit. As stated above, it is desired to provide a reverser that will fit the aircraft structure as it exists for other aerodynamic functions. It is also desired to provide a reverser that fits within the jet propulsion powerplant wherein the fan by-pass duct acts as a nozzle with the inner jet engine wall extending in a converging direction to minimize high drag. Further, it is desired to provide a reverser that allows for immediate and full thrust in the case of a wave-off or go-around condition during a landing operation. In other words, it is desirable that the engine be kept operating at its full thrust output and that the thrust reverser be such that it provides reverse thrust and can be immediately inactivated without the need for changing engine speed to resume acceleration. Furthermore, the thrust reverser may be made fail-safe so that it will assume an inoperative position in event of structural failure in those cases where it is used in flight. In those cases of thrust reversing during ground operation, it may be desirable to have the thrust reverser fail-safe in operating or reverse condition.

The main object of the present invention is to provide a thrust reverser that is applicable to high by-pass ratio turbofan engines and which, in one mechanism, substantially splits the function of the thrust reverser into two parts.

Another object is to provide such a reverser which maintains constant flow exhaust area out of the by-pass duct from forward cruise to full reverse so that the engine may operate at full speed at all times.

A further object is to provide a reverser which employs substantially the existing fan-engine structure of a high by-pass engine using the fan and engine as a propulsive nozzle with the engine wall converging downstream to reduce drag and to use this structure without compromising any of the aerodynamic characteristics desired for other functions.

A further object is to provide such a reverser which obtains, by use of a unique shroud structure, a very high percentage of reverse thrust.

Briefly stated, the invention is directed to use in a jet propulsion powerplant of the fan type having a jet engine enclosed within an inner and downstream converging wall and a fan concentric therewith and extending radially beyond the wall and surrounded by a cowling which ends upstream of the converging walls to form a by-pass duct and nozzle with the wall for low drag propulsive operation. Thrust reverser mechanism is provided in this powerplant comprising a plurality of peripherally disposed blocker flaps that are pivoted at one end on the converging wall downstream of the end of the cowling and actuation means is provided to rotate the flaps into an extended position to intercept the flow through the by-pass duct. Shroud means are provided on the end opposite the pivot end and the shroud means extend substantially parallel to the duct flow and upstream of the extended flaps to reverse the blocked flow. The shroud means must extend not less than 5% of the flap length for sufficient and adequate thrust reversal. The location of the pivot, the length of the shroud, and the cowl downstream end are interrelated such that the flap in the extended position forms a throat between the shroud and the cowl end that is substantially equal in area to the by-pass duct. Recessed means are provided in the engine wall to hold the flaps in the retracted position. Covering means for the retracted flaps are provided where required. In one modification the flaps are pivoted upstream for fail-safe operation in flight condition and another modification pivots the flaps downstream for fail-safe operation in ground operation.

While the specification concludes with claims particularly pointing out and distinctly claiming the subject matter which is regarded as the invention, it is believed the invention will be better understood from the following description taken in connection with the accompanying drawings in which:

FIG. 1 is a view partially in cross-section of a typical front fan powerplant supported from an aircraft wing and employing the instant invention;

FIG. 2 is a partial cross-sectional view in the area of the reverser showing the upstream pivoted reverser mechanism in both positions;

FIG. 3 is a view similar to FIG. 2 showing the downstream pivoted reverser mechanism in both positions;

FIG. 4 is a partial cross-sectional view showing the covering means for the retracted flaps;

FIG. 5 is a partial cross-sectional view illustrating articulated shroud structure and means for operation; and FIG. 6 is a partial perspective view illustrating adjacent flaps and sealing means therefor.

It should be understood that a front fan high by-pass ratio powerplant is described for illustration and the invention is equally applicable to aft fan powerplants as well as cruise fans. Also, the invention is particularly described in connection with a front fan powerplant with a concentric jet engine wherein the fan cowling does not extend completely back to the rear of the jet engine wall.

High by-pass ratio fans are those in which the ratio of fluid passing through the fan to that passing through the jet engine is about 8 to 1 or above. In such installations it may be necessary to reverse only the fan flow for satisfactory performance and the jet engine exhaust may be ignored.

Referring first to FIG. 1, there is shown a front fan powerplant of the general type that might employ the instant invention. To this end, any suitable aircraft structure such as a wing 10, may support an engine generally indicated at 11 by means of conventional strut structure 12. Engine 11 may be of the front fan concentric type as shown in FIG. 1 which employs an inner jet engine 13 discharging through a nozzle 14 to provide thrust. The jet engine is enclosed within an inner and downstream converging wall 15 which is so made to provide a propulsion nozzle with the fan stream and low drag engine as will be explained. While described in connection with a concentric fan-jet engine it should be noted that wall 15 may be the wall of a plug in a pure cruise fan fed from a remote gas generator in a well known manner. For convenience of description, the concentric arrangement will be described. In order to provide additional thrust, a fan 16 concentric with the engine and extending radially beyond the wall 15 is provided. The fan 16 is surrounded by a cowling 17 which is larger in diameter than the engine and extends upstream of the converging wall 15 as shown. The cowling 17 forms, with the engine wall 15, a by-pass duct and nozzle for additional thrust by movement of relatively large masses of lower velocity air in the well known manner. As explained above, in the high by-pass ratio type powerplant this mass of air through the by-pass duct may be eight or greater times the amount of air flow through the engine 13. As shown, the fan is used to propel fluid through the duct 18 as well as to supercharge the engine 13.

In order to provide a simplified, effective, and lightweight reverser for the fan structure and by-pass flow, it is desirable to make use of the engine structure as much as possible as part of the reverser mechanism. At the same time, it is desired that the aerodynamic surfaces including the cowling 17 be kept as thin as possible for aerodynamic reasons. Since a thrust reverser functions as both a blocker and a turning mechanism, it is desired to provide mechanism that performs both of the functions, if possible, in one unit and to stow it within the envelope of the engine wall 15. The inoperative thrust reverser mechanism must maintain the aerodynamic features of the engine substantially undisturbed.

Referring next to FIG. 2, it should be noted that the thrust reverser mechanism in this figure is that which would be used where fail-safe operation in flight is desired. To this end, the thrust reverser mechanism comprises a plurality of peripherally disposed blocker flaps 19 that are pivoted at one end, the upstream end 20, to the converging wall 15 downstream of the end of cowling 17 as shown. It can be seen that by pivoting in this manner, any failure of the mechanism provides fail-safe operation in flight by immediately closing the blocker doors out of operating position and to the retracted dotted position by force of the flow through the by-pass duct 18. In order to store the flaps 19 in their retracted position, the inner wall 15 is provided with suitable recessed means 21 which are adapted to permit the flaps 19 to close in flush as shown dotted with wall 15 for smooth continuation of the wall 15 structure. Preferably, the downstream end of cowl 17 and wall 15 form a nozzle therebetween and the converging feature of wall 15 then results in lower drag and a positive means of providing a slidable cover for covering flaps 19 is necessary as will be explained.

In order to block the flow through by-pass duct 18, the flaps 19 are rotated into an extended position as shown solid in FIG. 2 to intercept and block the flow through the duct. Any suitable actuation means 22 may be used to rotate flaps 19. Once the flow has been blocked it is necessary then to reverse it in order to obtain the function desired. To this end, shroud means 23 is provided on the flaps at the other end from pivot 22 and the shroud means extends substantially parallel to the flow through the duct 18 and also extends upstream of the extended flaps and thus makes an acute angle with the flaps in reversal position as shown. It is important that the shroud means extend upstream as shown not less than 5% of the length of flaps 19. Extension of the shroud turning means 23 for less than this distance does not result in sufficient turning or reversal to achieve the high reverse thrust required after blocking has been performed by flaps 19. It should be noted that this 5% limitation is a minimum length. Further, shroud 23 is essential on the ends of flaps 19 shown if reversal is to be obtained. As shown in FIG. 2 the absence of shroud 23 would result in thrust spoiling only with no reversal whatsoever.

Referring next to FIG. 3, there is shown a modification of flap structure such as might be used in the case of a fail-safe ground operation only. In such operation it is desired that the flaps remain extended in the event of structural failure in order to hold the aircraft on the ground and provide maximum reverse thrust. In this modification, the pivot 20 of flaps 19 is disposed at the downstream end of the flaps as shown and the flap closes into a retracted position forwardly and down into wall 15 and recess 21 into the dotted retracted position. In this modification, it will be noted that shroud means 23 forms an obtuse angle with flap 19. As between the FIG. 2 and FIG. 3 arrangement it will be appreciated that the FIG. 3 arrangement would require less storage space in recess 21 as far as engine diameter is concerned than would the similar structure in FIG. 2 because of the obtuse angle shroud 23 makes with flap 19 in FIG. 3.

In both modifications, it is important that the pivot 20 be located in conjunction with the length of the flaps 19 and shroud means 23 so that a particular exhaust area is formed. Since it is desired that the engine operate at full speed or at full thrust position at all times for most efficient operation as well as instantaneous operation in the case of a wave-off, it is necessary that the engine see the constant area exhaust for which it is designed for maximum efficiency. To this end, the disposition of these members is made so that the flap extended throat area at throat 24 that is formed between the end of shroud 23 on flap 19 and the end of cowl 17, is substantially equal in area to that of the by-pass duct 18. By the term "substantially equal" is meant that no choked flow can occur between the cowl and the extended flaps. Thus, the effective flow area for the engine must be kept at the same. Because of some finite pressure losses in making the turn and reversal, there is a slight enlargement of the throat area up to approximately 10%. The term "substantial" is intended to include this range because the effective flow area thus remains the same and the engine sees a constant area exhaust permitting it to be operated at full speed for safety and at design speed for maximum efficiency whether in the reversed or in the cruse position. Opening the flaps beyond this point of maintaining the same effective areas merely requires larger and heavier hardware and serves no useful purpose.

In the event that it is desired to provide a smoother structure over the retracted flaps, it is possible to provide a cover means 25 as shown in FIG. 4 that would be in the shape of a cone because of the converging wall 15. This cover is axially and concentrically movable from the solid line position shown to the dotted position where it covers the retracted flaps 19. With sufficiently accurately machined parts it may be possible to dispense with cover means 25.

In order to provide for more compact structure, it may be desirable to make the shroud means 23 articulated so that it may be actuated to fold in against flap 19 whether pivoted upstream as in FIG. 2 or downstream as in FIG.

3. Such structure, as it might be applied to FIG. 3 is shown in FIG. 5. The specific structure is illustrative only of a typical actuation mechanism. As such, shroud means 23 may be pivoted to flaps 19 at pivot 26. Both the flap and shroud may be cut away to nest together at 27 when in the folded dotted position in wall 15. Shroud 23 is extended into turning operative position by control rod 28 pivoted at both ends and offset from the flap pivot 20 and shroud pivot 26 as shown. Movement by an actuator 29 acting through ring 30 which moves link 31 to open flap 19 into extended position automatically operates shroud means 23 into operative position. Similarly, reverse operation folds the shroud into position on flap 19 and both nest in recess 21 in wall 15 to present a smooth airflow surface. The actuator 29 and link 31 may be buried in the engine wall 15 as shown or strut 12 respectively, although the individual links 31 for each flap may be exposed presenting no problem since the air being blocked by flap 19 and turned by shroud 23 is cool fan air. Obviously, the cover means 25 of FIG. 4 may be used if necessary to cover the flaps as before, the flaps in turn covering the actuation means in retracted position.

In order that the flaps intercept all of the duct flow and the shroud means 23 turn it sufficiently forward for adequate reverse thrust, it is necessary that sealing be provided between the individual and peripherally disposed flaps since the flaps tend to separate or open flower-like when in the extended position. A suitable mechanism to accomplish this is shown in FIG. 6 wherein the individual flaps 19 are provided with stepped portions 32 as a typical execution and the stepped portion 32 may be provided symmetrically as shown on each flap or on alternate flaps. Similar stepped structure will be used on the shroud means 23. The flaps may then slide over one another along their edges as shown when they are closed to the retracted position and open away from each other while always maintaining a solid wall to the fluid in the open position as shown in FIG. 6. In all cases then flaps 19 and shroud means 23 provide a sealing means between adjacent members which are expandable in the extended position as shown.

It will be apparent that the thrust reverser herein disclosed provides for maintaining the cowling and associated structure undisturbed aerodynamically and still permits the reversing function to be performed in one of two modifications within the normally present structure. The use of flaps for blocking, with the specially oriented shroud means on one end provides for turning when aligned as indicated. This is done while maintaining a substantially constant area for by-pass flow in all modes of operation. The result in a reverser that provides effective thrust reversal of a large percentage of flow—up to 70%—while using existing engine structure without major modification.

While there have been described preferred forms of the invention, obvious modifications and variations are possible in light of the above teachings. It is therefore to be understood that within the scope of the appended claims, the invention may be practiced otherwise than as specifically described.

I claim:

1. In a jet propulsion powerplant of the fan type having a jet engine enclosed within an inner and downstream converging wall and a fan concentric therewith extending radially beyond said wall and surrounded by a cowling ending upstream of said converging wall and forming a by-pass duct therewith, thrust reverser mechanism comprising, a plurality of peripherally disposed blocker flaps pivoted at one end to said converging wall downstream of the end of said cowling, actuation means for rotating said flaps into extended position to intercept the flow through said duct, shroud means on the other end of said flaps and extending substantially parallel to the duct flow and upstream of said extended flaps to reverse the blocked flow, said shroud means extending not less than five percent of said flap length, said shroud means and cowl end forming a throat substantially equal in area to the by-pass duct when said flaps are in extended position, and recess means in the wall to hold said flaps in retracted position.

2. Apparatus as described in claim 1 wherein the end of said cowling and said converging wall form a nozzle whose area is substantially equal to said throat area.

3. Apparatus as described in claim 1 wherein the pivot at said one end of said flaps is disposed at the upstream end of said flaps and said shroud forms an acute angle with the other end of said flap in reversal position.

4. Apparatus as described in claim 1 wherein the pivot at said one end of said flaps is disposed at the downstream end of said flaps and said shroud forms an obtuse angle with the other end of said flap in reversal position.

5. Apparatus as described in claim 2 having cover means axially and concentrically movable along said wall to cover said recessed flaps flush with said wall.

6. Apparatus as described in claim 2 wherein said concentric fan is a front fan and said shroud means on said flaps is articulated to fold flush with said flaps in said recess.

7. Apparatus as described in claim 2 wherein said flaps have sealing means therebetween to expand in extended position.

8. Apparatus as described in claim 6 having means pivoting said shroud means to said flaps, and actuation means connecting said shroud means, flaps, and engine wall and operable to pivot said shroud means into substantially parallel turning position on extension of said flaps to blocking position.

9. Apparatus as described in claim 5 having means pivoting said shroud means to said flaps, and actuation means connecting said shroud means, flaps, and engine wall and operable to pivot said shroud means into substantially parallel turning position on extension of said flaps to blocking position.

References Cited by the Examiner

UNITED STATES PATENTS

| | | | |
|---|---|---|---|
| Re. 23,198 | 2/1950 | Anxionnaz | 60—35.6 |
| 2,396,911 | 3/1946 | Anxionnaz | 60—35.6 |
| 2,929,580 | 3/1960 | Ciolkosz. | |
| 2,945,346 | 7/1960 | Arnzen | 60—35.54 |
| 3,040,524 | 6/1962 | Kurti | 60—35.54 |

MARK NEWMAN, *Primary Examiner.*

C. R. CROYLE, *Assistant Examiner.*